(12) United States Patent
Whitted

(10) Patent No.: US 7,113,409 B1
(45) Date of Patent: Sep. 26, 2006

(54) MOUNTING STRUCTURES FOR ELECTRONICS COMPONENTS

(75) Inventor: William H. Whitted, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 10/676,822

(22) Filed: Sep. 30, 2003

(51) Int. Cl.
*H05K 7/02* (2006.01)
*H05K 7/20* (2006.01)

(52) U.S. Cl. .................. 361/804; 361/742; 361/770; 361/685; 361/807; 361/809; 361/758

(58) Field of Classification Search ........ 361/684–686, 361/735, 742, 770, 804, 807–809, 758; 360/97.01; 369/275.1; 29/830
See application file for complete search history.

(56) References Cited

U.S. PATENT DOCUMENTS

| | | | | |
|---|---|---|---|---|
| 2,783,416 A * | 2/1957 | Butler | ........................ | 361/684 |
| 4,342,068 A * | 7/1982 | Kling | ........................ | 361/717 |
| 4,630,175 A * | 12/1986 | Lerude et al. | .............. | 361/816 |
| 5,680,293 A * | 10/1997 | McAnally et al. | .......... | 361/685 |
| 5,788,211 A * | 8/1998 | Astier | ........................ | 248/674 |
| 5,801,920 A * | 9/1998 | Lee | ........................... | 361/685 |
| 5,921,644 A * | 7/1999 | Brunel et al. | ............ | 312/223.2 |
| 6,078,498 A * | 6/2000 | Eckerd et al. | .............. | 361/685 |
| 6,418,011 B1* | 7/2002 | Omori | ........................ | 361/683 |
| 6,431,879 B1* | 8/2002 | Brekosky et al. | ............. | 439/74 |
| 6,473,309 B1* | 10/2002 | Parson | ....................... | 361/759 |
| 6,599,136 B1* | 7/2003 | Sheldon et al. | ............... | 439/92 |
| 6,804,123 B1* | 10/2004 | Cheng | ........................ | 361/784 |

* cited by examiner

*Primary Examiner*—Kamand Cuneo
*Assistant Examiner*—Dameon E. Levi
(74) *Attorney, Agent, or Firm*—Jung-hua Kuo

(57) ABSTRACT

Mounting structures for facilitating fast and easy installation and/or removal of electronics components into or out of a computer system are disclosed. The mounting structures include a base and a stackable mounting structure. Each mounting structure generally includes generally parallel and opposing spacers, tapered supports extending from the spacers to engage holes defined on a surface of an electronics component, and a base portion extending between being generally orthogonal to the spacers. The spacers may define orifices to facilitate securing the mounting structure and the electronics component to an electronics base via, e.g., a hook and loop material. The stackable mounting structure may include sharp points and angled legs to also engage the electronics component below.

22 Claims, 4 Drawing Sheets

MOUNTING STRUCTURES FOR ELECTRONICS COMPONENTS

BACKGROUND OF THE INVENTION

1. Field of the Invention

The present invention relates generally to mounting structures for electronics components. More specifically, mounting structures for facilitating fast and easy installation and/or removal of electronics components into or out of a computer system are disclosed.

2. Description of Related Art

Servers are commonly employed in computer networks such as the Internet. As an example, servers are often used to host web sites and/or web search engines that can be accessed by numerous computers over the Internet. Servers typically include high performance processors as well as hardware and software capable of handling high volumes of network traffic.

Many of today's more complex computing systems such as computer server systems are often rack-mounted systems in which a number of removable electronics modules, such as electronics trays, are positioned and stacked relative to each other in a shelf-like manner within a frame or rack. Rack-mounted systems allow the arrangement of several of the electronics modules in a vertical orientation for efficient use of space. Each electronics module can be slid into and out of the rack-mounting system. Typically; the electronics modules are inserted from the front of the rack and various cables such as data cables, power cables, etc., are connected to the electronics modules at the front and/or rear of the rack.

Each electronics module may correspond to a different server or each electronics module may hold one or more components of a server. Examples of electronics modules include modules for processing, storage such as random access memory (RAM), network interfaces and controllers, disk drives such as floppy disk drives, hard drives, compact disk (CD) drives, and digital video disk (DVD) drives, parallel and serial ports, small computer systems interface (SCSI) bus controllers, video controllers, power supplies, and so forth. A server farm in today's computing environment may include numerous racks that hold various types of computer-related modules.

When an electronics component on a given electronics module is to be serviced or replaced, a service technician would need to remove the electronics module from the server rack and then remove the electronics component from the electronics module. The electronics components are often mounted to the electronics module via mounting screws engaged with threaded mounting holes provided by the electronics components. The electronics components typically provide threaded mounting holes on the left and right sides and/or on the bottom surface of the electronics component. The service technician must first remove all the mounting screws for the particular electronics component before the electronics component can be removed from the electronics module.

However, in many electronics modules, the electronics components are mounted side-by-side in close proximity with other electronics components such that access to the mounting screws and the mounting holes are often blocked. Because access to the mounting screws may be awkward and difficult, removing or installing the mounting screws and the electronics component is often a difficult task. Not only does such a removal or installation process require the use of tools but access to the mounting screws may also be awkward and difficult. The servicing or replacing of an electronics component thus becomes a difficult, labor intensive, and time consuming process. The result is increased system downtime and increased cost resulting from both the system down time and increased labor costs associated with the service technician.

Thus, it would be desirable to provide a mechanism to facilitate fast and easy installation and/or removal of an electronics component into or out of a computer such as an electronics module of a rack mounted computer system.

SUMMARY OF THE INVENTION

Mounting structures for facilitating fast and easy installation and/or removal of electronics components into or out of a computer system are disclosed. It should be appreciated that the present invention can be implemented in numerous ways, including as a process, an apparatus, a system, a device, or a method. Several inventive embodiments of the present invention are described below.

The mounting structures include a base mounting structure and a stackable mounting structure. Each mounting structure may include generally parallel and opposing spacers, tapered supports extending from the spacers to engage holes defined on a surface of an electronics component, and a base portion extending between being generally orthogonal to the spacers. The spacers may define orifices to facilitate securing the mounting structure and the electronics component to an electronics module via, e.g., a hook and loop material. The stackable mounting structure may include sharp points and angled legs to also engage the electronics component below.

A method for mounting an electronics component generally includes positioning an electronics component onto opposing spacers of a mounting structure, engaging supports extending from the spacers with holes defined on a surface of the electronics component and securing the electronics component and the mounting structure to each other.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Mounting structures for facilitating fast and easy installation and/or removal of electronics components into or out of a computer system are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
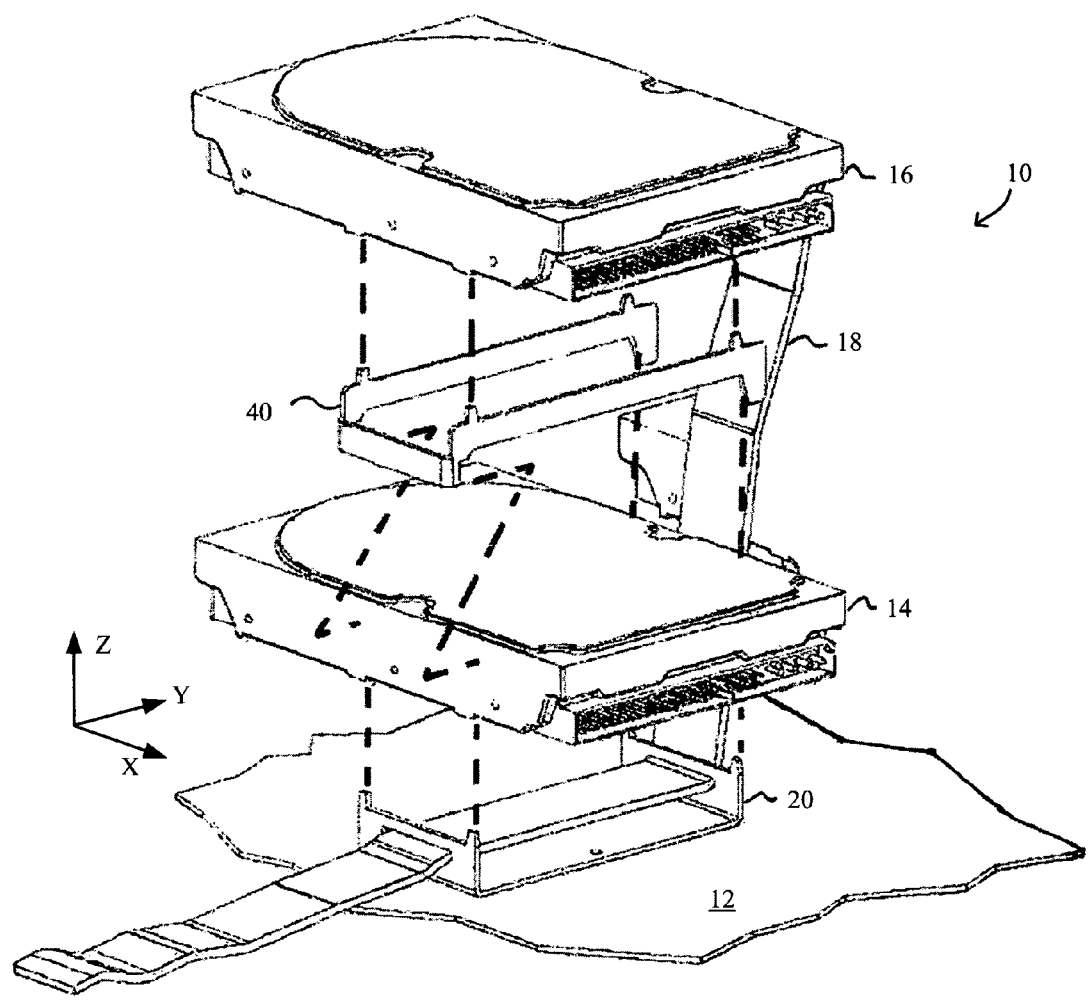
FIG. 1 is an exploded perspective view of an electronics module with an electronics base, a base and stackable mounting structures and a first and second electronics components.
Figure 2:
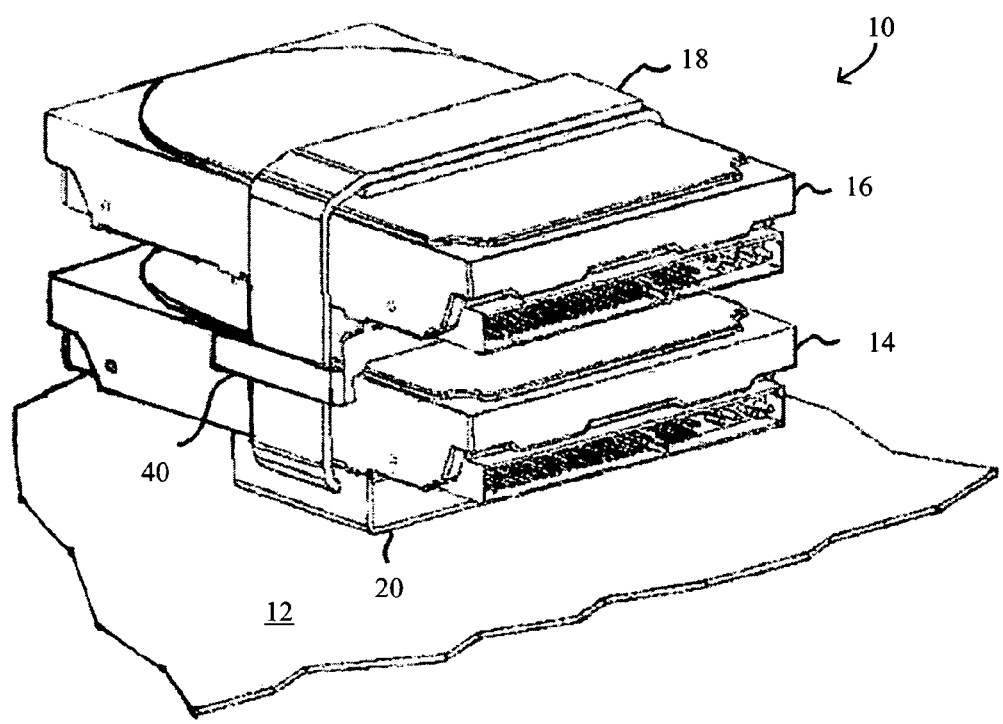
FIG. 2 is a perspective view of the electronics module of FIG. 1 in an assembled configuration.

FIG. 1 is an exploded perspective view and FIG. 2 is a perspective view of an electronics module 10 with an electronics base 12, a first electronics component 14 mounted to the electronics base 12 via a base mounting structure 20 and a second electronics component 16 mounted to and spaced apart from the first electronics component 14 via a stackable mounting structure 40. The electronics components 14, 16 and the mounting structures 20, 40 are secured to each other using, for example, a length of flexible fastening material 18 such as a hook and loop material commonly referred to as Velcro. Any other suitable fastening material may be used. In particular, a fastening material that allows repeated fastening and unfastening is preferred.

In the examples presented and illustrated herein, the electronics components 14, 16 are hard drives. However, each of the electronics components 14, 16 may be any suitable component such as modules for the system motherboard, system cooling fans, disk drives including floppy disk drives, hard drives, compact disk (CD) drives, and digital video disk (DVD) drives, power supplies, and so forth. Although not necessary, the stacked electronics components 14, 16 are generally the same or similar type of components.

Figure 3:
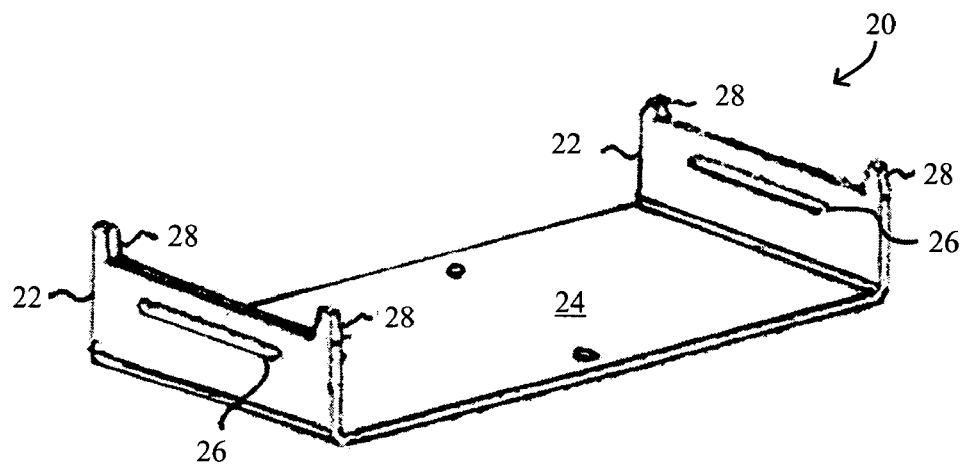
FIG. 3 is a perspective view illustrating the base mounting structure of FIG. 1 in more detail.

The base mounting structure 20 is described in more detail with reference to FIGS. 1 and 2 as well as FIG. 3. FIG. 3 is a perspective view illustrating the base mounting structure 20 only. The base mounting structure 20 is preferably rigidly attached to the electronics base 12 using any suitable mechanism such as screws, rivets, bolts, adhesive, welding, and so forth. The base mounting structure 20 may alternatively be integrally formed with the electronics base. Although the base mounting structure 20 may be removable from the electronics base 12, the base mounting structure 20 typically does not need to be removed from the electronics base 12. The base mounting structure 20 includes two opposing, generally parallel spacers 22 and a base plate 24 extending between the spacers 22. The spacers 22 are approximately orthogonal to the base plate 24 and to the electronics base 12.

Each spacer 22 defines an orifice or slot 26 through which the flexible fastening material 18 may be threaded (as shown in FIGS. 1 and 2). The orifices 26 are preferably at least slightly wider than the flexible fastening material 18 to facilitate the passing of the fastening material 18 therethrough. For the same reason, the height of the orifices 26 is preferably at least slightly greater than the thickness of the flexible fastening material 18. The spacers 22 not only facilitate in supporting and securing the first electronics component 14 but also provide a separation or air space between the first electronics component 14 and the electronics base 12. Such physical separation facilitates airflow below the first electronics component 14 to prolong the life of the first electronics component 14 and allows the flexible fastening material 18 to pass under the first electronics component 14 and through the orifices 26.

Figure 4:
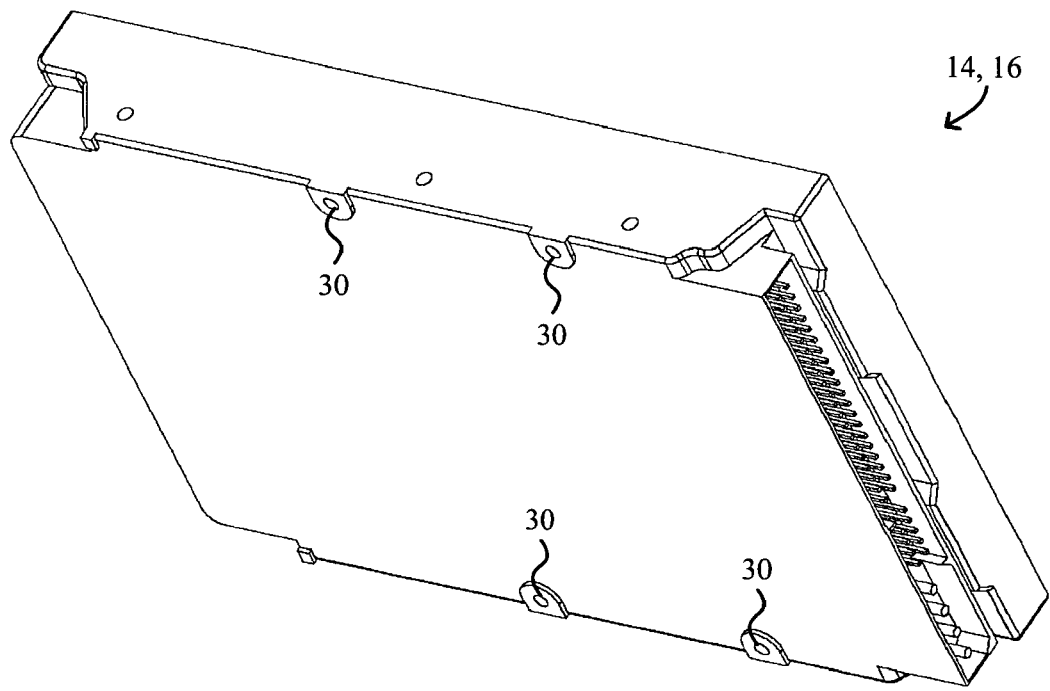
FIG. 4 is a bottom view of an illustrative hard drive that may serve as the electronics components shown in FIGS. 1 and 2.

Each spacer 22 also includes two supports 28 preferably positioned to correspond to and mate with mounting holes provided in the first electronics component 14. The mounting holes are typically threaded. A bottom view of an illustrative hard drive that may serve as the electronics component 14 or 16 is shown in FIG. 4. The hard drive is provided with threaded mounting holes 30 into which the supports 28 may be placed. Thus, the width (X direction as shown) and length (Y direction as shown) of the base mounting structure 20 may be generally determined by the locations of the threaded mounting holes provided in the first electronics component 14. It is noted that the configuration (e.g., location, thread size, minimum and maximum engagements, etc.) of the threaded mounting holes 30 for hard drives are often defined by industry standards. The same may be true for various other types of electronics components such that the base mounting structure 20 and the stackable mounting structure 40 may each be configured for various different types of electronics components. Note that although four supports 28 are shown and described herein, any suitable number of supports may be provided. For example, the base mounting structure 20 preferably provides at least three non-linear supports so that their top surfaces (or points) generally define a plane parallel to the bottom surface of the first electronics component 14 so as to provide stability to the first electronics component 14 and prevent wobble. Further, the supports 28 are preferably approximately evenly distributed about the center of mass of the electronics component 14.

As seen in FIGS. 1 and 3, each support 28 is preferably tapered so that its cross-sectional area decreases as the supports 28 extend further from the base plate 24. The tapering of the supports 28 allows the supports 28 to bite into and thus be more securely embedded or otherwise better driven or pushed into the corresponding threaded mounting holes of the first electronics component 14. The tapering of the supports 28 utilizes the force exerted by the flexible fastening material 18 and/or gravity (where the electronics module 10 and the mounting structures 20, 40 are deployed in the orientation shown in FIG. 1) to better support and secure the first electronics component 14 thereto. For example, the tapering of the supports 28 may allow the weight of the first electronics component 14 (and anything else mounted above the first electronics component 14) to further drive the supports 28 into the corresponding mounting holes of the first electronics component 14. In addition, the base mounting structure 20 is preferably made of a metal, e.g., steel, harder than that used for the mounting holes of electronics components, typically aluminum. Hardness generally refers to resistance to plastic deformation. The steel supports 28 thus are likely to better bite into the aluminum threads of the mounting holes. The contact between the steel supports 28 and the mounting holes may also provide an electrical connection between the base mounting structure 20 and the first electronics component 14 so as to provide electrical grounding of the first electronics component 14.

Figure 5:
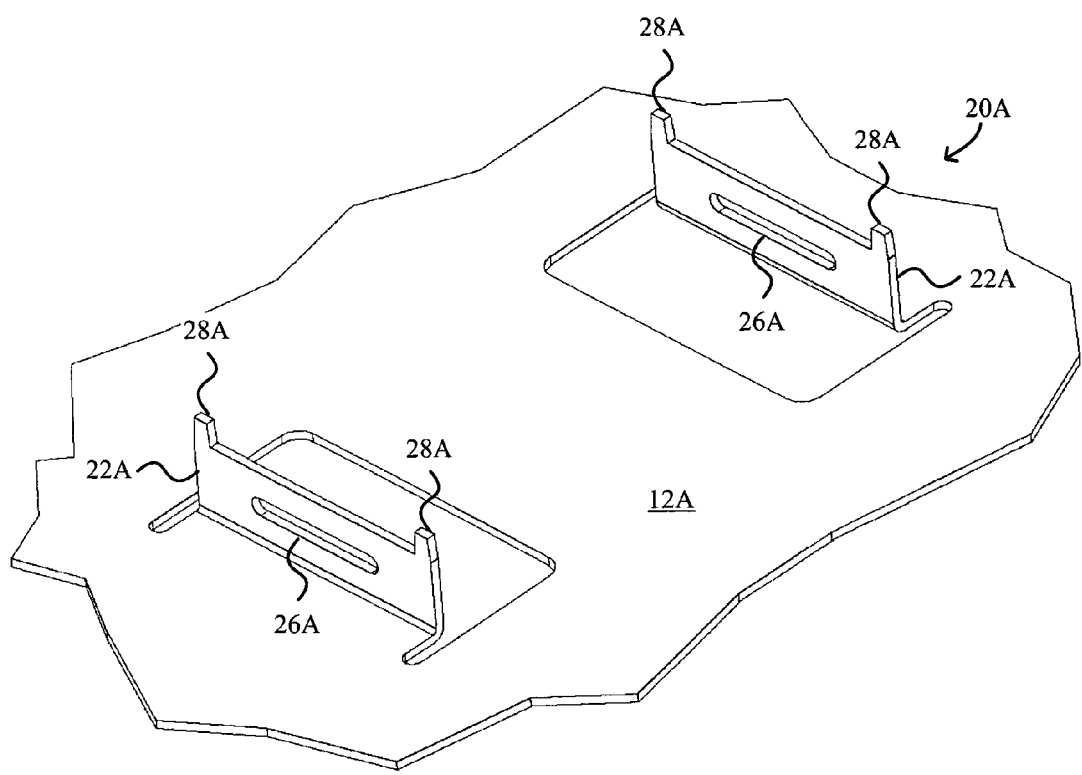
FIG. 5 is a perspective view illustrating an alternative configuration of the base mounting structure.

The base mounting structure 20 may be formed from a piece of material separate from the electronics base 12 as shown in FIGS. 1 and 2. Alternatively, the base mounting structure may be formed integrally from the same piece of material, e.g., steel, as the electronics base 12. FIG. 5 is a perspective view illustrating such an alternative configuration of the base mounting structure 20A and electronics base 12A. As shown, the base mounting structure 20A is formed by cutting and/or removing an appropriate amount of material to form the opposing spacers 22A, the orifices 26A, and the tapered supports 28A. The opposing spacers 22A are bent to be approximately orthogonal to the electronics base 12A. Note that the base mounting structure 20A does not include a base plate to connect the opposing spacers 22A. Rather, the electronics base 12A (from which the base mounting structure 20A is formed) serves that purpose by functioning as an integral base portion.

The base mounting structure may be utilized alone or in conjunction with the stackable mounting structure 40 to support the second electronics component 16 at a distance from the first electronics component 14. It is noted that while the stackable mounting structure 40 is mounted to the first electronics component 14, the stackable mounting structure 40 need not be used in conjunction with the base mounting structure. Instead, the first electronics component 14 may be secured to the electronics base 12 in any other suitable manner.

Figure 6:
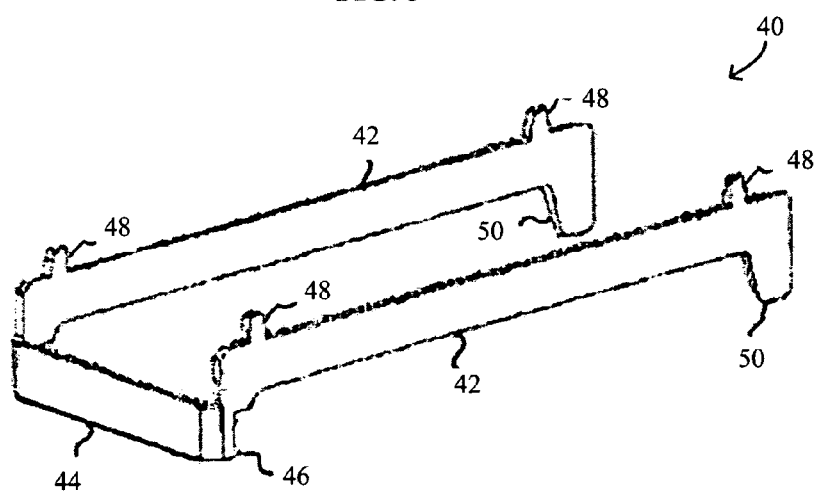
FIG. 6 is a perspective view of the stackable mounting structure of FIG. 1 in more detail.

The stackable mounting structure 40 is shown in the perspective view of FIG. 6 and will now be described with reference to FIGS. 1 and 2 as well as FIG. 6. The stackable mounting structure 40 is preferably mounted to the first electronics component 14 as shown in FIGS. 1 and 2. The stackable mounting structure 40 includes two opposing, generally parallel spacers 42 and a connecting member 44 extending between and connecting the spacers 42 at one end of the spacers 42. The spacers 22 are approximately orthogonal to the connecting member 44 and, when mounted, to the electronics base 12.

The spacers 42 facilitate in supporting and securing the second electronics component 16 to the first electronics component 14 and also provide a separation or air space between the electronics components 14, 16. As noted above, such physical separation facilitates airflow below the electronics components 14, 16 to help prolong the life of both electronics components.

Each spacer 42 includes two supports 48 preferably positioned to correspond to and mate with the threaded mounting holes provided in the second electronics component 16, similar to those provided in the first electronics component 14 as described above with reference to FIG. 4. Other features and functionality of the supports 48 of the stackable mounting structure 40 that are the same as or similar to those of the supports 28 of the base mounting structure 20 (e.g., tapered supports) are evident and will not be repeated for purposes of clarity. In addition, similar to the base mounting structure 20, the stackable mounting structure 40 is preferably also made of steel so as to be able to bite into the corresponding mounting holes provided in the second electronics component 16. The contact between the steel supports 48 and the mounting holes may also provide an electrical connection between the stackable mounting structure 40 and the second electronics component 16 so as to provide electrical grounding of the second electronics component 16.

Each spacer 42 also includes an angled or tapered leg 50. The angle or taper of the leg 50 faces the first electronics component 14 and engages the first electronics component 14 so as to utilize the force exerted by the flexible fastening material 18 and/or gravity (where the electronics module 10 and the mounting structures 20, 40 are deployed in the orientation shown in FIG. 1) to better support and secure the first electronics component 14 thereto. In particular, the tapering of the legs 50 allows the legs 50 to be further pushed onto the first electronics component 14. Depending upon the angle of the taper, the angled leg 50 may also facilitate in controlling the vertical spacing (Z direction) between the electronics components 14, 16. The legs 50 also facilitate in providing a grounding connection between the second electronics component 16 and the first electronics component 14 which in turn has a grounding connection to the electronics base 12 via the base mounting structure 20.

The connecting member 44 preferably provides sharp points 46 that point toward and bite into the side of the first electronics component 16. The biting by the sharp points 46 into the side of the first electronics component 16 facilitates in maintaining stability of the stackable mounting structure 40 relative to the first electronics component 14 (particularly in the Y direction) and thus also facilitates in the installation process of the stackable mounting structure 40 and the second electronics component 16.

The connecting member 44 preferably also provides flat supports 52 that make contact with the first electronics component 14 to help to position one side of the stackable mounting structure 40 on the first electronics component 14. It is dimensioned relative to the tapered legs 50 so as to help ensure that the first and second electronics components 14, 16 are relatively parallel and stable.

As shown in dashed in FIG. 1, when the stackable mounting structure 40 is mounted to the first electronics component 14, the end with the tapered legs 50 is lifted relative to the first electronics component 14 while the end with the sharp points 46 is lowered such that the sharp points 46 bite into the side of the first electronics component 16. The end with the tapered legs 50 is then lowered down until the tapered legs 50 engage the first electronics component 14. The second electronics component 16 may be mounted to the stackable mounting structure 40 either before or after the stackable mounting structure 40 is mounted to the first electronics component 14.

The stackable mounting structure 40 is optionally configured such that, when mounted, a spacing is provided between the connecting member 44 and the side of the second electronics component 16 so as to allow the flexible fastening material 18 to be passed through that spacing (as shown in FIG. 2). The spacing defined by the connecting member 44 and the second electronics component 16 is preferably at least slightly wider than the flexible fastening material 18 to facilitate the passing of the fastening material 18 therethrough. For the same reason, the depth of the spacing is preferably at least slightly greater than the thickness of the flexible fastening material 18.

As noted above, the flexible fastening material 18 may be provided to facilitate fastening the electronics components 14, 16 and the mounting structures 20, 40 to each other and, in turn, to the electronics base as the base mounting structure 20 is secured to or integral with the electronics base 12. The flexible fastening material 18 preferably also dampens the vibration that may otherwise be present. Such vibrations are undesirable in hard drives as vibrations tend to increase seek times and increase drive read/write errors.

The flexible fastening material 18 may be a hook and loop material commonly known as Velcro, although any other suitable material may be employed. The flexible fastening material 18 preferably can wrap around and/or through the electronics components 14, 16 and the mounting structures 20, 40 and preferably is secured by overlapping onto itself and securing one end section to the other end section as shown in FIG. 2.

It is noted that various other fastening mechanisms may be utilized. As an example of an alternative fastening mechanism, a length of flexible and elastic fastening material may be provided with rigid hooks on either end. The fastening material would wrap around and/or through the electronics components 14, 16 and the mounting structures 20, 40 and be fastened to itself by engaging the rigid hooks on the ends of the fastening material. As another example, rather than the fastening rigid hooks of the fastening mechanism to each other, the rigid hooks may instead be fastened to the connecting member 44 of the stackable mounting structure 40.

As a further example, the rigid hooks of the fastening mechanism may instead be fastened to the orifices 26 of the first mounting structure 20. In this example, the fastening mechanism need not fully wrap around the electronics components 14, 16 and the mounting structures 20, 40. For example, the wrapping would begin with one rigid hook engaged to the base mounting structure 20 through one orifice 26 and end with the other rigid hook engaged through the other orifice 26 such that the fastening mechanism (other than the hooks) does not pass through the orifices 26 nor does it pass over the base plate 24. As is evident, various other suitable fastening mechanisms may be implemented and employed.

Both the base and stackable mounting structures disclosed herein reduce manufacturing costs and assembly time as fewer parts are required. The mounting structures also reduces repair time and system downtime as installation and/or removal of electronics components is easier, faster, less complex and more intuitive. For example, the base and stackable mounting structures do not require tools for disassembly and assembly and only a single fastener is used. The mounting structures along with a suitable fastening mechanism also help to control vibrations of the electronics components. Such features significantly decrease the amount of time required for the service technician to perform maintenance and/or repair tasks. The stackable mounting structure also allows the electronics components to be stacked, thereby conserving space within the electronics module.

As noted, one example of a suitable type of electronics component for which the base and stackable mounting structures may be configured is the hard drive. In addition, while the mounting structures are described and illustrated in the context of an electronics module, such as for a network server housed in a server rack, the mounting structures may be employed in any other suitable environment such as a personal computer, television, automobiles, and so forth.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An electronics component mounting system, comprising:
    a first mounting structure including:
        two generally parallel and opposing spacers configured to space a first electronics component to be mounted to the first mounting structure from an electronics base, the first mounting structure being configured to be attached to the electronics base;
        a plurality of supports extending from the spacers, the supports being configured to engage holes defined on a surface of the first electronics component;
        a base portion extending between the two generally parallel and opposing spacers, the spacers and the supports being generally orthogonal to the base portion; and
        a space formed by the spacers, the base portion, and the electronics component when mounted to the first mounting structure to facilitate cooling of the electronics component when mounted to the first mounting structure.

2. The system of claim 1, wherein each spacer defines an orifice configured to allow a fastening mechanism to pass therethrough and engage thereto.

3. The system of claim 1, further comprising a fastening mechanism to secure the first mounting structure to the first electronics component.

4. The system of claim 3, wherein the fastening mechanism comprises a hook and loop material.

5. The system of claim 1, wherein the supports are tapered so that the supports decrease in size as the supports extend away from the spacers.

6. The system of claim 5, wherein the supports are made of a material that is harder than the material of the holes defined on the surface of the first electronics component.

7. The system of claim 1, further comprising:
    the electronics base, the first mounting structure being rigidly attached to the electronics base, the first mounting structure and the electronics base being separately formed.

8. The system of claim 1, further comprising:
    the electronics base, the first mounting structure being integrally formed with the electronics base.

9. The system of claim 1, wherein the base portion extending between the spacers includes a plurality of sharp points configured to face and be secured to a surface of a second electronics component onto which the first mounting structure and the first electronics component are stacked.

10. The system of claim 9, further comprising angled legs extending from the spacers and opposing the sharp points, the angled legs having an angled surface to engage the second electronics component.

11. The system of claim 9, further comprising:
    a second mounting structure including:
        two generally parallel and opposing second spacers;
        a plurality of second supports extending from the second spacers, the second supports being configured to engage holes defined on a surface of the second electronics component to be mounted on the second mounting structure,
        a second base portion extending between the two generally parallel and opposing second spacers, the second spacers and the second supports being generally orthogonal to the second base portion.

12. The system of claim 1, further comprising:
    a second mounting structure including:
        two generally parallel and opposing second spacers;
        a plurality of second supports extending from the second spacers, the second supports being configured to engage holes defined on a surface of a second electronics component to be mounted on the second mounting structure,
        a second base portion extending between the two generally parallel and opposing second spacers, the second spacers and the second supports being generally orthogonal to the second base portion, the second mounting structure being configured to be mounted to the first electronics component.

13. An electronics component mounting apparatus, comprising:
    component mounting means for securing a first electronics component to an electronics base, including:
    means for spacing the first electronics component from the electronics base, the spacing means being configured to form a space between the first electronics component to be mounted on the component mounting means and the electronics base to facilitate cooling of the first electronics component when mounted to the component mounting means, the component mounting means being configured to be attached to the electronics base;
    means for engaging a plurality of holes defined on a surface of the first electronics component to be mounted on the mounting means, said means for engaging extends from said means for spacing; and
    means for securing the component mounting means to the first electronics component.

14. The apparatus of claim 13, wherein said means for spacing defines a means for allowing a fastening mechanism to engage thereto.

15. The apparatus of claim 13, wherein said means for engaging includes means for engaging holes defined on the surface of the first electronics component to be mounted on said component mounting means.

16. The apparatus of claim 13, further comprising means for biting into a surface of a second electronics component onto which the component mounting means and the first electronics component are stacked.

17. A method, comprising the steps of:
    positioning a first electronics component onto opposing spacers of a first mounting structure, the spacers being configured to form a space between the first electronics component to be mounted to the first mounting structure and an electronics base to facilitate cooling of the first electronics component when mounted to the first mounting structure, the first mounting structure being configured to be attached to the electronics base;
    engaging a plurality of supports extending from the spacers with holes defined on a surface of the first electronics component such that the space is defined by the spacers and the first electronics component; and
    securing the first electronics component and the first mounting structure to each other.

18. The method of claim 17, wherein the step of securing includes the step of engaging a fastening mechanism to orifices defined in the opposing spacers of the first mounting structure.

19. The method of claim 17, wherein the step of engaging includes the step of engaging the spacers with holes defined on the surface of the first electronics component.

20. The method of claim 17, further comprising the steps of:
    securing a plurality of sharp points of a member connecting the opposing spacers to a surface of a second electronics component onto which the first mounting structure and the first electronics component are to be stacked.

21. The method of claim 20, further comprising the step of resting angled legs extending from the opposing spacers and opposite the sharp points onto the second electronics component.

22. The method of claim 20, further comprising the steps of
    positioning the second electronics component onto opposing spacers of a second mounting structure;
    engaging a plurality of second supports extending from the second spacers of the second mounting structure with second holes defined on a second surface of the second electronics component, wherein the step of securing includes securing the second electronics component to the first electronics component and the first mounting structure.

* * * * *